C. W. BECKER.
POTATO HARVESTER.
APPLICATION FILED SEPT. 2, 1909.
956,272.
Patented Apr. 26, 1910.
3 SHEETS—SHEET 2.
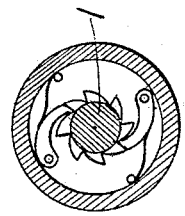
Fig. 8.
Fig. 2.
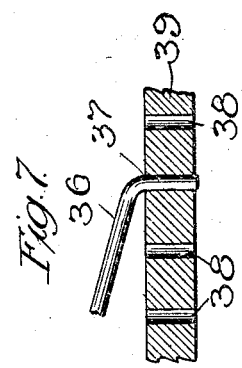
Fig. 7.
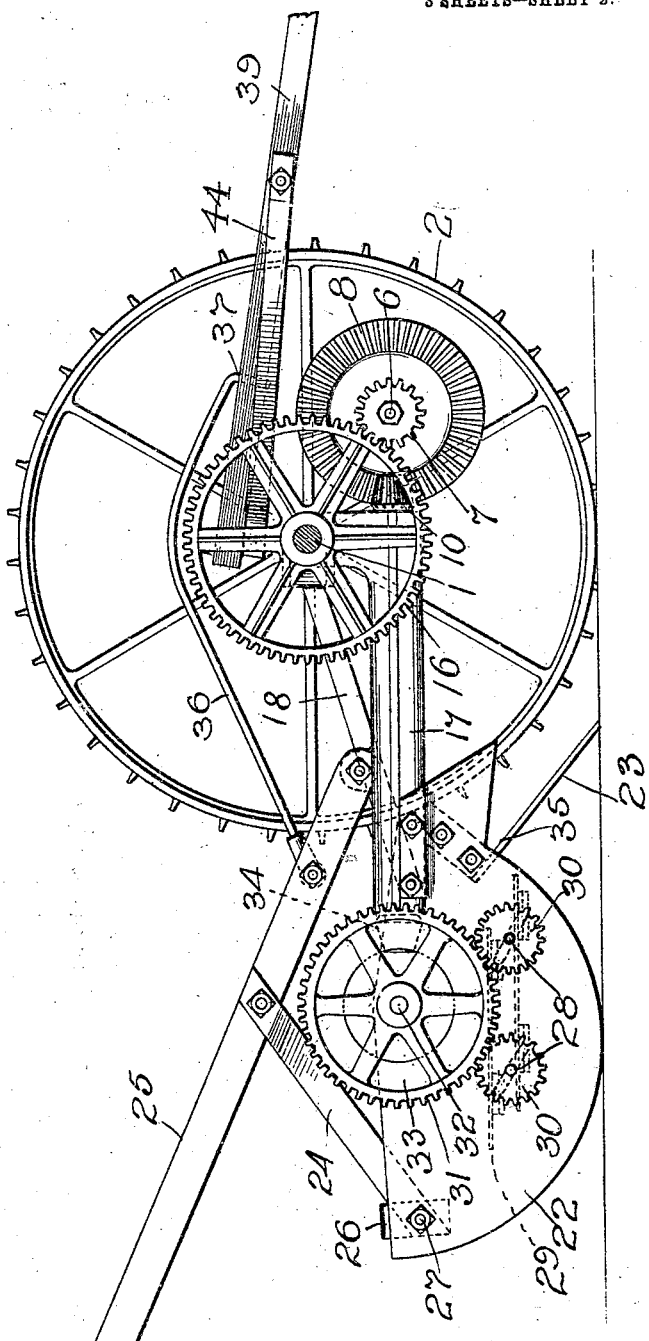
Witnesses
H. R. L. White
R. A. White.
Inventor
Charles W. Becker
By Rudolph Atty.

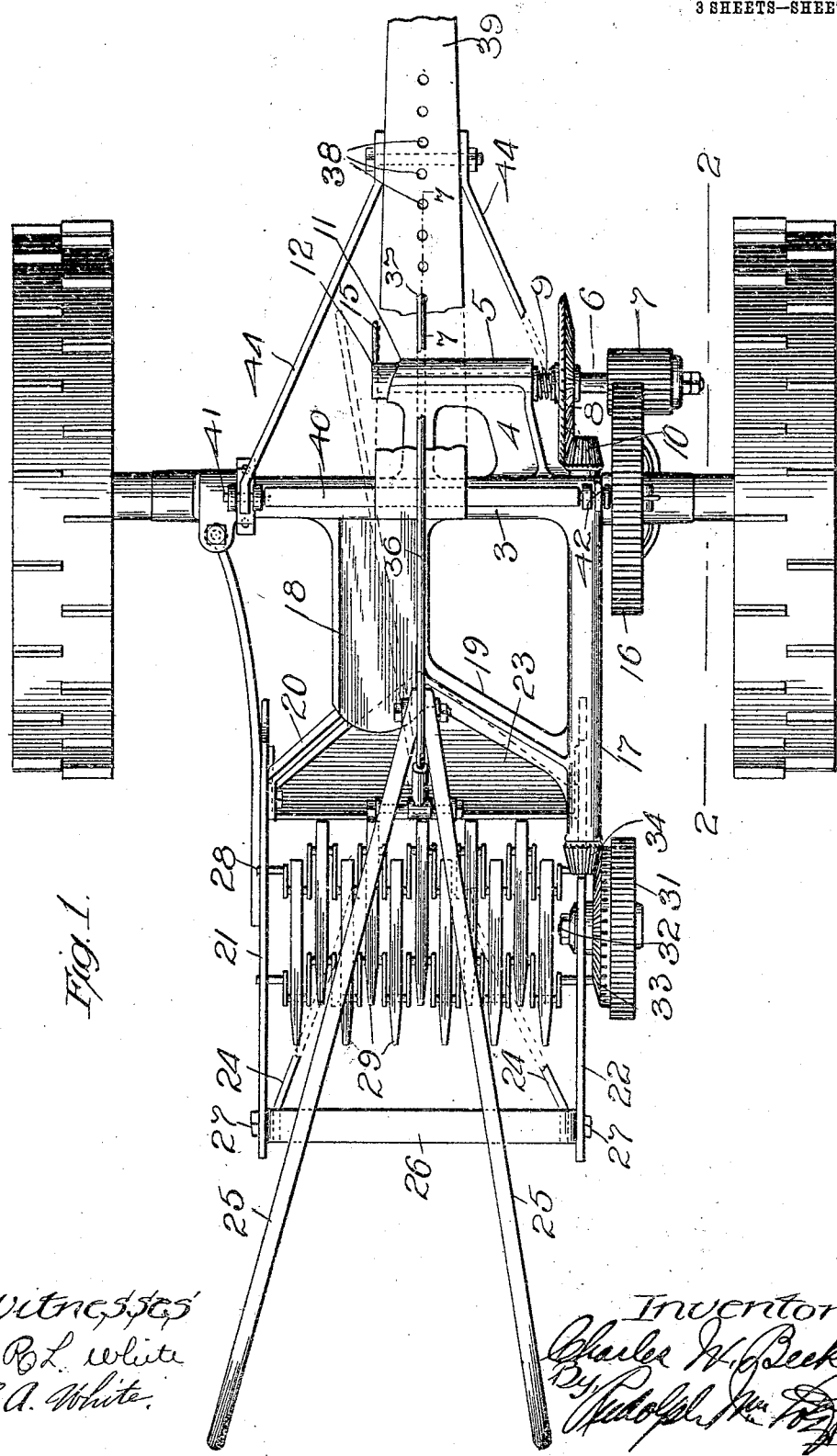

C. W. BECKER.
POTATO HARVESTER.
APPLICATION FILED SEPT. 2, 1909.
956,272.
Patented Apr. 26, 1910.
3 SHEETS—SHEET 3.
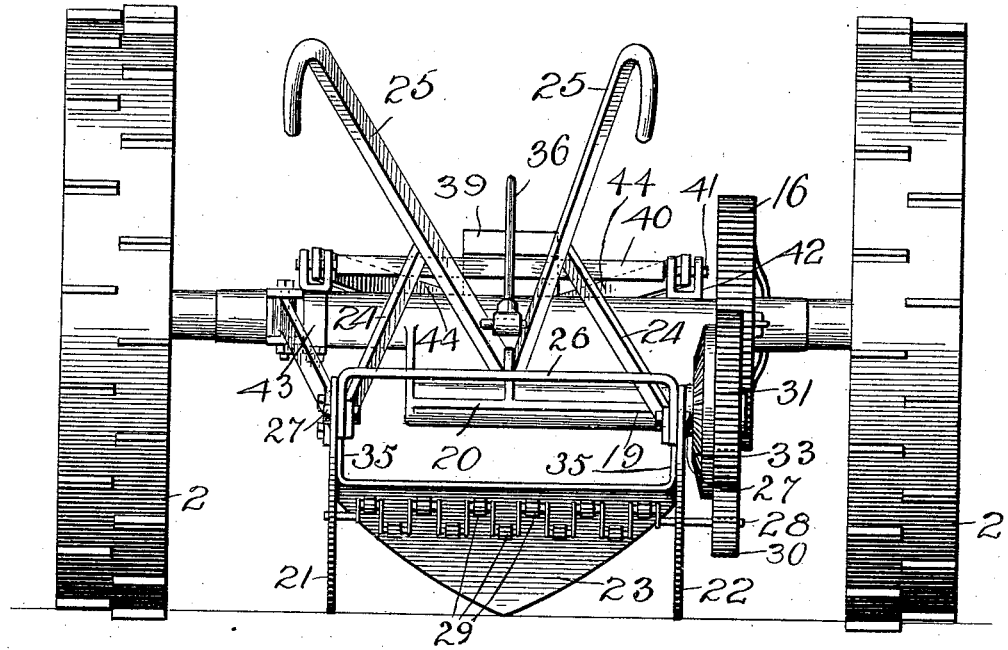
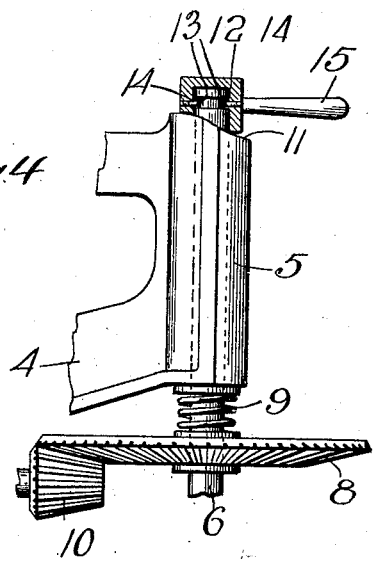
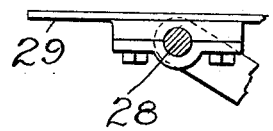
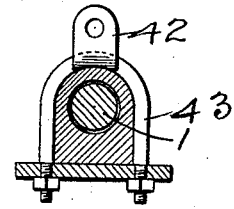

UNITED STATES PATENT OFFICE.

CHARLES W. BECKER, OF EVANSTON, ILLINOIS.

POTATO-HARVESTER.

956,272.  Specification of Letters Patent.  Patented Apr. 26, 1910.

Application filed September 2, 1909. Serial No. 515,968.

*To all whom it may concern:*

Be it known that I, CHARLES W. BECKER, citizen of the United States, residing at Evanston, in the county of Cook and State of Illinois, have invented certain new and useful Improvements in Potato-Harvesters; and I do hereby declare the following to be a full, clear, and exact description of the invention, such as will enable others skilled in the art to which it appertains to make and use the same.

This invention relates to a novel construction in a potato harvesting machine, the object being to provide a very simple, light and efficient machine of this character and consists in the features of construction and combinations of parts hereinafter fully described and claimed.

In the accompanying drawings illustrating my invention: Figure —1— is a plan view of a potato harvester constructed in accordance with my invention. Fig. —2— is a vertical longitudinal section of the same on the line 2—2 of Fig. —1—. Fig. —3— is a rear elevation of the same. Fig. —4— is a fragmentary detail top plan view showing means employed for throwing two gears into and out of mesh with each other. Fig. —5— is a fragmentary detail sectional view showing the connection between cranks and vibrating shakers. Fig. —6— is a fragmentary detail section on an enlarged scale showing the means connecting the draft gear with the body of the machine. Fig. —7— is a fragmentary detail longitudinal section on the line 7—7 of Fig. —1—. Fig. —8— is a fragmentary detail section showing a pawl and ratchet connection between the drive shaft and traction wheels.

My present invention has for its main object to provide a potato harvester which is capable of being turned in a very small space to enable the same to harvest potatoes in adjacent rows consecutively and further to provide a light, simple and efficient machine of this character of relatively few parts and in which the entire drive gear is practically mounted and supported upon a single casting which is journaled upon the main shaft of the machine.

My said machine comprises the main shaft 1 which is supported upon the wheels 2 each of which has a pawl and ratchet connection with said shaft, as shown in Fig. —8—, so as to cause the latter to rotate therewith when the machine moves forward but permits the inner wheel in turning a curve to rotate more slowly than the outer wheel. Such pawl and ratchet connection is old and well-known and requires no special description. Rotatably mounted on said shaft 1 is a casting comprising a sleeve 3 through which said shaft 1 passes and integral with which is a bracket 4 having in its free end a bearing 5 axially parallel with said sleeve 3. In said bearing 5 a countershaft 6 is journaled which carries a relatively long gear pinion 7 which is rigid therewith and also carries a bevel gear 8 which is likewise rigid therewith. A spring 9 is interposed between said bevel gear 8 and one end of said bearing 5 and serves to normally maintain said bevel gear in mesh with a bevel pinion 10, said spring being confined between washers to prevent wear or distortion thereof. Said shaft 6 is longitudinally movable in said bearing 5, the latter being equipped at its other end with a helical face 11 against which a similar helical face upon one end of a cap 12 is adapted to bear. Said cap 12 is rotatably mounted upon the other end of said shaft 6 by means of pins 13 projecting into an annular groove 14 in said end of said shaft as shown in Fig. —4—. Said cap is turned by means of a handle 15 and when moved in one direction serves to draw said shaft 6 against the action of said spring 9 to throw the bevel gear 8 out of mesh with the bevel pinion 10. A spur gear 16 is rigidly mounted on the shaft 1 and meshes with said bevel pinion 7, the latter being of broader face than said gear 16 so as to permit the same to slide longitudinally in accordance with the longitudinal movement of the shaft 6 without becoming disengaged from said gear 16. The said bevel gear 10 is mounted upon one end of a countershaft which is journaled in a bearing 17 extending at right angles to the sleeve 3 at a lower elevation but which is an integral part of said casting. The latter includes as a part thereof a channeled member 18 extending rearwardly from the sleeve 3 and which is connected at its free end with the free end portion of the bearing 17 by means of a rib arm 19 constituting a brace. A similar brace arm 20 extends at an incline from the opposite side of said channeled member 18 and is secured at its free end to one of two parallel side plates 21 and 22 respectively between which the shaker mechanism is disposed and to which the shovel or plow 23 is secured at one end. Said side plates 21 and 22 are secured respectively to the said arm 20 and to a flange or rib on said bearing 17 and at their other ends are secured by means of the braces 24 with the plow handles 25, the latter being secured at one end to one of the flanges of said channeled member 18. A cross-bar 26 connects said side plates 21 and 22 together at their rear ends, a single bolt 27 serving to connect one end of said cross-bar 26 and one end of one of said side plates. Journaled in said side plates 21 and 22 are two parallel crank shafts 28 each of which is provided with a plurality of cranks at regular intervals and which are disposed parallel with each other. On each pair of cranks a bar 29 is mounted which is adapted to be vibrated by the rotation of said shafts 28 adjacent bars being moved vertically in opposite direction simultaneously and causing potatoes disposed thereon to be so agitated as to loosen and shake the earth therefrom in a well-known manner. On each of said shafts 28 is a spur pinion 30 both of which mesh in a spur gear 31 loosely mounted on a stud 30 secured in a side plate 22. Rigid with said spur gear 31 is a bevel gear 33 which meshes with the bevel pinion 34 which is rigidly mounted upon the other end of the shaft journaled in the bearing 17 and carrying said bevel pinion 10. The plow or shovel 23 is of substantially triangular shape and is provided at its widest portion with side flanges 35 which are secured by means of bolts to the said side plates 21 and 22 respectively. The said widest portion of said plow or shovel 23 is disposed on a plane slightly higher than the upper limit of movement of the bars 29 so as to deliver earth containing potatoes upon the latter in a manner which will prevent injury of the potatoes.

The operation of the device is as follows: The operator follows the machine in exactly the same manner as the plow is followed, the depth of penetration of the nose of the shovel 23 being determined by the operator in the usual manner. The device is adapted to be drawn by a team of horses and in drawing the same the wheels 2 impart movement by means of the train of gears described to the crank shafts 28 and thereby to the shaker arms or bars 29, the latter serving by their relatively vertically reciprocating movement to loosen and shake off the earth from the potatoes and at the same time tend to throw such earth and potatoes toward the rear ends of said bars thus preventing clogging of the machine. In crossing a road or when it is desired to avoid penetration of the plow and operation of the mechanism the turning of the handle 15 in one direction serves to throw the bevel gear 8 out of mesh with the bevel pinion 10 thus preventing transmission of the rotary movement of said shaft 6 to the said crank shafts 28.

The shovel or plow 23 may be elevated and prevented from penetrating the earth and locked in its elevated position by means of the rod 36 secured at one end to the plow handles 25 and which is provided at its other end with a projection 37 which is adapted to enter any one of a series of openings 38 in the pole 39 thereby maintaining said plow or shovel 23 elevated as will be obvious. The said pole 39 is secured to a cross-bar 40 which at its ends is provided with cylindrical projections 41 entering openings in the projections 42 of collars 43 mounted upon the sleeve 3 of said casting in a well-known manner. Braces 44 are secured at one end to said pole and at their other ends are provided with openings through which said projections 41 pass, said last-named ends of said braces 44 being received between said projections 42.

The use of a single casting to support the main portion of the drive gear is obviously very advantageous in that it minimizes the number of joints in the machine and thereby provides less danger of accident or damage to the machine.

The strains on the casting are mainly tension strains which it is easily able to bear with no danger of fracture. At the same time the machine is thereby rendered very compact and relatively very light and easily operated.

I claim as my invention:

1. A potato harvester comprising a main shaft supported at its ends on wheels and rotated thereby, a sleeve rotatably mounted on said shaft between the ends thereof, a bearing parallel with said sleeve and integral therewith, a bearing extending transversely to said sleeve at a lower elevation and integral therewith, a spur gear rigid on said main shaft, a countershaft in said first-named bearing, a spur-pinion rigid therewith and meshing with said spur gear, a bevel gear rigid on said countershaft, a second countershaft journaled in the transversely disposed bearing, a bevel pinion at each end thereof rigid therewith, one of said pinions meshing with said bevel gear, a frame having parallel side-plates supported on said sleeve, a pair of parallel crank-shafts journaled in said plates, vibrating bars carried by the cranks of said shafts, a spur pinion rigid with each of said crank-shafts, a stud on one of said side plates, a spur-gear rotatable thereon and meshing with said spur pinions, bevel gear rigid with said spur gear and meshing with the other of said bevel pinions on said second countershaft, and a shovel secured at one end to said side plates and adapted at its forward end to penetrate and raise earth and potatoes and deliver the same upon said vibrating bars.

2. A potato harvester comprising a main shaft supported at its ends on wheels and rotated thereby, a sleeve rotatably mounted on said shaft between the ends thereof, a bearing parallel with said sleeve and integral therewith, a bearing extending transversely to said sleeve at a lower elevation and integral therewith, a spur gear rigid on said main shaft, a countershaft in said first-named bearing, a spur-pinion rigid therewith and meshing with said spur gear, a bevel gear rigid on said countershaft, the latter being longitudinally movable in said bearing, a spring normally maintaining said shaft at one limit of its movement, a cam end on said bearing, a cam member rotatably mounted on said shaft and engaging said cam-end of said bearing and serving when turned in one direction to move said shaft longitudinally against the action of said spring, a second countershaft journaled in the transversely disposed bearing, a bevel pinion at each end thereof rigid therewith, one of said pinions meshing with said bevel gear, a frame having parallel side-plates supported on said sleeve, a pair of parallel crank-shafts journaled in said plates, vibrating bars carried by the cranks of said shafts, a spur pinion rigid with each of said crank-shafts, a stud on one of said side plates, a spur-gear rotatable thereon and meshing with said spur pinions, bevel gear rigid with said spur gear and meshing with the other of said bevel pinions on said second counter-shaft, and a shovel secured at one end to said side plates and adapted at its forward end to penetrate and raise earth and potatoes and deliver the same upon said vibrating bars.

3. A potato harvester comprising a carriage, consisting of a single casting, a drive shaft supported on and adapted to be rotated by wheels journaled in a bearing in said casting, a spur gear rigid with said shaft, a bearing in said casting axially parallel with said first-named bearing, a countershaft in said last-named bearing longitudinally movable therein, means on said shaft and said bearing imparting longitudinal movement to the former in one direction, a spring normally maintaining said shaft at one limit of its movement, a spur pinion and a bevel gear rigid on said shaft, a second countershaft journaled in a bearing in said casting and extending at right angles to the first-named countershaft, bevel pinions rigidly mounted upon the ends of said second countershaft, a frame supported on said casting, a pair of parallel crank-shafts journaled in said frame, vibrating bars supported on said crank shafts, spur pinions rigid with the latter, a spur gear meshing therewith, a bevel gear rigid with said spur gear and meshing with one of said bevel pinions on said second countershaft, the other bevel pinion thereon meshing with said first-named bevel gear and said first-named spur pinion meshing with the spur gear on said drive-shaft, a shovel supported at its rear end in said frame above the upper limit of movement of the vibrating bars, a pair of plow handles connected with said casting and adapted to enable the same to be turned on said drive-shaft to raise said shovel clear of the earth, a draft pole pivotally secured to said casting, and a connecting-rod adjustably connecting said pole and said plow handles and adapted to support said frame and shovel in an elevated position.

In testimony whereof I have signed my name in presence of two subscribing witnesses.

CHARLES W. BECKER.

Witnesses:
RUDOLPH WM. LOTZ,
A. W. NEWCOMB.